(12) United States Patent
Mills et al.

(10) Patent No.: US 12,095,675 B2
(45) Date of Patent: Sep. 17, 2024

(54) COMMUNICATIONS SYSTEM AND METHOD

(71) Applicant: SITA Information Networking Computing UK Limited, Middlesex (GB)

(72) Inventors: Ryan Michael Mills, Lancaster (GB); Matthew Harold Broadbent, Lancaster (GB); Veronique Cristini, Heraklion (FR)

(73) Assignee: SITA Information Networking Computing UK Limited (GB)

( * ) Notice: Subject to any disclaimer, the term of this patent is extended or adjusted under 35 U.S.C. 154(b) by 18 days.

(21) Appl. No.: 17/618,632

(22) PCT Filed: Jun. 18, 2019

(86) PCT No.: PCT/GB2019/051702
§ 371 (c)(1),
(2) Date: Dec. 13, 2021

(87) PCT Pub. No.: WO2020/254777
PCT Pub. Date: Dec. 24, 2020

(65) Prior Publication Data
US 2022/0239605 A1 Jul. 28, 2022

(51) Int. Cl.
*H04L 47/70* (2022.01)
*G06Q 10/0631* (2023.01)
(Continued)

(52) U.S. Cl.
CPC ....... *H04L 47/82* (2013.01); *G06Q 10/06315* (2013.01); *H04L 41/0896* (2013.01);
(Continued)

(58) Field of Classification Search
CPC . H04B 7/15507; H04B 7/0408; H04W 24/02; H04L 63/08; H04L 47/25
See application file for complete search history.

(56) References Cited

U.S. PATENT DOCUMENTS

| 8,499,324 B1 * | 7/2013 | Mitchell | ................. H04L 67/02 709/219 |
| 2005/0071076 A1 | 3/2005 | Baiada et al. | |

(Continued)

FOREIGN PATENT DOCUMENTS

| KR | 20140094271 A | 7/2014 |
| WO | 2020254777 A1 | 12/2020 |

OTHER PUBLICATIONS

International Search Report and Written Opinion issued in International Application No. PCT/GB2019/051702 mailed Aug. 8, 2019; 13 pages.

*Primary Examiner* — Barbara B Anyan
(74) *Attorney, Agent, or Firm* — Morris, Manning & Martin, LLP; Daniel E. Sineway, Esq.; Adam J. Thompson, Esq.

(57) ABSTRACT

There is provided systems, methods and computer program products for dynamically allocating bandwidth of a network in a transportation network. The system comprises a module (103) that receives schedule data including data defining a plurality of different journeys and data defining an equipment type. The module (103) identifies an event type for each journey based on the schedule data and generates a request to change the bandwidth allocation of the network based on a first event type and the equipment type. This advantageously enables the system to efficiently allocate bandwidth to a plurality of customers without exceeding a network bandwidth capacity.

19 Claims, 3 Drawing Sheets

(51) Int. Cl.
  *H04L 41/0896*  (2022.01)
  *H04L 41/5025*  (2022.01)
  *H04L 67/02*    (2022.01)
  H04L 67/12      (2022.01)
  H04W 24/02      (2009.01)
  H04W 64/00      (2009.01)

(52) U.S. Cl.
  CPC .......... *H04L 41/5025* (2013.01); *H04L 67/02* (2013.01); *H04L 67/12* (2013.01); *H04W 24/02* (2013.01); *H04W 64/006* (2013.01)

(56) References Cited

U.S. PATENT DOCUMENTS

| | | | |
|---|---|---|---|
| 2011/0301829 A1 | 12/2011 | White | |
| 2012/0096159 A1* | 4/2012 | Short | H04L 63/08 709/225 |
| 2013/0080617 A1 | 3/2013 | Driesen et al. | |
| 2015/0365798 A1* | 12/2015 | McEvilly | H04L 47/25 455/456.5 |
| 2016/0119052 A1* | 4/2016 | Frerking | H04W 24/02 455/431 |
| 2016/0119938 A1* | 4/2016 | Frerking | H04B 7/1851 370/316 |
| 2017/0149688 A1 | 5/2017 | Chitti et al. | |
| 2018/0343570 A1* | 11/2018 | Misenheimer | H04W 64/006 |
| 2020/0244346 A1* | 7/2020 | Goettle | H04B 7/0408 |
| 2022/0238025 A1* | 7/2022 | McCann | G08G 5/0039 |

* cited by examiner

COMMUNICATIONS SYSTEM AND METHOD

CROSS REFERENCE TO RELATED APPLICATIONS

This application is a national phase application of, and claims benefit of and priority to International Application No. PCT/GB2019/051702, filed Jun. 18, 2019, entitled "IMPROVED COMMUNICATIONS SYSTEM AND METHOD," the disclosure of which is incorporated herein by reference as if set forth herein in its entirety.

FIELD OF THE INVENTION

This invention relates to a system, apparatus, method or computer program for controlling or using a communications network. In particular, but not exclusively, this invention relates to a system, apparatus, method or computer program for controlling or using a software defined network. The communications system or network may be deployed at an airport, seaport, train station, other transportation hubs or travel termini.

BACKGROUND OF THE INVENTION

Software Defined Networking (SDN) has been under development for some time and allows for management of a network as well as improved network configuration and performance, compared to traditional networks.

However, these traditional networks suffer from a number of problems, particularly for critical networks where the provision of network services is vital, and a lack of availability of the network is considered unacceptable for safety and regulatory reasons. In such critical networks, uptimes or availabilities of the network must be guaranteed within certain tolerances by providing a user of the network with a satisfactory quality of service level. Once measure of a satisfactory quality of service in the air transport industry (ATI) is a network availability of 99.999% of the time. However, providing this level of network availability is very difficult to achieve for all locations and environments within the ATI.

Failure to meet these levels is, at the very best, damaging to the network provider's reputation, and is not acceptable for critical networks where network availability must be guaranteed for safety and regulatory reasons.

Furthermore, telecommunication solutions at airports are historically set up based on an estimated planned usage. With the digital transformation of the Air Transport Industry (ATI), the emergence of cloud-based applications, and the trend for larger aircraft such as the Airbus 380 or Boeing 787, networks are increasingly required to provide additional bandwidth as the number of network accessible devices increases.

Additionally, modern aircraft types are able to offload more sophisticated telemetry data and other flight-related data. In particular, A380 or B787 are very "digital" aircraft which generate peaks in data traffic and demand for bandwidth compared to previous generations of aircraft. This problem is anticipated to become more prevalent as other, more sophisticated, aircraft types are introduced. Accordingly, it is extremely difficult to adapt the network to this dynamic environment.

Although networks are already available at airports, these solutions have limitations. For example, they are reliant on manual and/or lengthy processing, static environments and are reactive solutions rather than proactive.

Embodiments of the invention seek to address these problems by using new SDN technologies associated to the ATI applications via APIs. This may be done by tracking specific events and updating the network bandwidth based on these events. In some specific examples, the events are associated with an airport and the network is provided for use by an airport and its users, customers, contractors, officials and so on.

Embodiments of the invention seek to address the above problems by providing a network controller or system for controlling a network. Usually, the network has a unified forwarding and control plane, which prevents outside interaction. However, in SDNs the network is instead logically separated in to two distinct layers, usually a forwarding layer and a control layer. The control layer is able to change and modify the network by software in near-real time.

When the network is coupled with intelligent control which defines the way that traffic is moved through the network, a software-defined network may be provided which is able to identify or determine that it has been, or will be, affected by an event. Based on this determination, a network controller may be configured to remedy and rectify these issues by predicting or anticipating failures.

The network controller may further be configured to execute response strategies for such failures and implement alternative approaches when such failures are identified. This has a number of advantages. Firstly, the time taken to repair a network may be reduced. Secondly, the network itself can recognise or identify network performance issues that may not be identified by a human operator. Further, this may be achieved without the need for a network engineer to identify the network performance issues.

Software Defined Networking (SDN) and machine learning/artificial intelligence could become a powerful tool for making networks more reliable and secure. Artificial Intelligence may bring a new perspective on Network Optimization (Delivery Service Chaining, Service Management, Infrastructure Operations, (Cyber)Security Management, Capacity and Planning).

SUMMARY OF THE INVENTION

The invention is defined by the independent claims, to which reference is now made. Preferable features are outlined in the dependent claims.

A first aspect of the invention relates to a computer processing system for dynamic bandwidth allocation of a network in a transportation network, the system comprising: a module configured to receive schedule data, wherein the schedule data comprises data defining a plurality of different journeys between an origin and a destination, and data defining an equipment type, identify a predetermined event type for each journey based on the schedule data, and generate a request to change the bandwidth allocation of the network based on the predetermined event type and the equipment type.

The first aspect of the invention advantageously provides a system having improved operational efficiency, since the dynamic network architecture enables network resources to be saved by enabling multiple customers to share a network connection without exceeding a maximum bandwidth capacity.

In one embodiment, the module is further configured to generate the request in response to identifying the predetermined event type for a particular journey. This feature is advantageous in that the system is able to react to a particular event occurring.

In another embodiment, the system further comprises a second module communicatively coupled to the first module and configured to receive the request to change the bandwidth allocation of the network.

In another embodiment, the system further comprises a local access network including one or more control devices communicatively connected to the second module.

In an embodiment, the one or more control devices are configured to provide a network connection to a customer via a customer network. This enables the customer's access to the network to be controlled via the one or more control devices.

In another embodiment, the module is further configured to identify an amount of data associated with the equipment type for a selected journey. In preferred embodiments, different equipment types have different data requirements, and so this feature advantageously enables the system to allocate a suitable amount of bandwidth appropriate for the equipment type.

In another embodiment, the module is further configured to identify a current bandwidth allocation for a customer. This advantageously enables the system to identify a particular customer's maximum allowable share of the total available bandwidth and to allocate further bandwidth appropriately.

In an embodiment, the module is configured to generate the request based on the amount of data associated with the equipment type for a selected journey and the current bandwidth allocation for the customer. This advantageously enables the system to compare a current bandwidth allowance with how much data the customer is expected to require imminently, thereby determining whether a customer will exceed their bandwidth allocation.

In another embodiment, the module is further configured to receive updates to the schedule data. This advantageously enables the system to be notified of any changes to the schedule data thereby ensuring that the system operates using the most recent set of schedule data.

In another embodiment, the module further comprises a memory for storing a parsed version of the schedule data. This advantageously enables the system to store a version of the schedule data locally, thereby reducing the amount of times requests need to be sent to obtain schedule data.

In another embodiment, the schedule data further comprises data defining an estimated time associated with each of the plurality of journeys.

In another embodiment, the module is further configured to identify the predetermined event type by comparing a current time with the estimated time associated with one of the journeys. This advantageously enables the system to determine whether a particular event has occurred yet.

In another embodiment, the module is further configured to generate the request if the current time is greater than the estimated time associated with one of the journeys. This advantageously enables the system to only send the request when it has been established that a particular event has occurred.

In another embodiment, the module is further configured to compare the current time to the estimated time in response to a predefined event. This advantageously enables the system to only calculate whether a particular event has occurred at certain times, thereby reducing computational burden.

In further embodiments, the predefined event is a predetermined time interval. As above, this advantageously reduces the number of calculations that the system needs to execute thereby computational burden.

In further embodiments, the equipment type is an aircraft type. In further embodiments the journeys are flights. In further embodiments, the schedule data is flight schedule data. In further embodiments, the flight schedule data comprises one or more of passenger related information, flight number, flight date, flight status, scheduled arrival time, estimated arrival time scheduled departure time, or estimated departure time. In some embodiments, the estimated time is the estimated arrival time or the estimated departure time of a flight. In some embodiments, the event type is a flight status, and the first event type is an indicator that the flight has arrived or departed. In other embodiments, the current time is the time at the destination. These features have the advantage that the system may be used in the air travel industry.

In further embodiments, the module is further configured to enable data exchange between an aircraft and the transportation network, preferably wherein the data comprises one or more of flight plans, weather forecasts, passenger-related data, baggage-related data, aircraft diagnostic reports, and flight entertainment data. This advantageously enables information to be exchanged between the aircraft and the airport in a time efficient and convenient manner.

In further embodiments, the system is configured for use in a hub and spoke airport system.

In a second aspect, a computer processing system for dynamic bandwidth allocation of a network comprises a module configured to receive schedule data defining a flight between an origin and destination and comprising an estimated time associated with the flight, periodically compare the current time to the estimated time of a particular flight, send a request to modify the performance of the network, receive confirmation that the modification of the performance of the network is complete, send a request to modify the network to provide a predetermined bandwidth allocation, receive confirmation that the modification of the network to provide the predetermined bandwidth allocation has been completed; and assess the current bandwidth requirements for users of the network. The advantages relating to the second aspect of the invention are the same as those relating to the first aspect of the invention.

In an embodiment, the schedule data includes an equipment type associated with the flight.

In another embodiment, the request to modify the network to provide a predetermined bandwidth allocation is based on the equipment type and the comparison between the current time and the estimated time associated with the flight. This enables the system to only send the request in certain instances, thereby improving the effectiveness of the system.

In another embodiment, the module is further configured to send the request to modify the network to provide a predetermined bandwidth allocation if the current time is greater than estimated time associated with the flight. As above, this enables the system to only send the request in certain instances, thereby advantageously improving the effectiveness of the system.

In another embodiment, the module is further configured to receive schedule data in response to a request from the module.

In another embodiment, the module is further configured to subscribe to receive changes to the schedule data. This advantageously enables the system to be notified of any updates to the schedule data thereby ensuring that the system operates using the most recent set of schedule data.

In a third aspect, a method for dynamically allocating bandwidth of a network in a transportation network comprises receiving schedule data at a module, wherein the schedule data comprises data defining a plurality of different journeys between an origin and a destination, and data defining an equipment type, identifying, with the module, a predetermined event type for each journey based on the schedule data, generating, at the module, a request to change the bandwidth allocation of the network based on the predetermined event type and the equipment type. Advantages related to the third aspect of the invention are the same as those for the first aspect of the invention.

In a fourth aspect, a method for dynamically allocating bandwidth of a network comprises receiving, at a module, schedule data defining a flight between an origin and destination and comprising an estimated time associated with the flight, periodically comparing, with a module, the current time to the estimated time of a particular flight, sending, from the module, a request to modify the performance of the network, receiving, at the module, confirmation that the modification of the performance of the network is complete, sending, from the module, a request to modify the network to provide a predetermined bandwidth allocation, receiving, at the module, confirmation that the modification of the network to provide the predetermined bandwidth allocation has been completed; and assessing, with the module, the current bandwidth requirements for users of the network. The advantages relating to the fourth aspect of the invention are the same as those relating to the second aspect of the invention.

In a fifth aspect, a computer program undertakes the method of the third or fourth aspects when executed.

BRIEF DESCRIPTION OF THE DRAWINGS

An embodiment of the invention will now be described, by way of example only, and with reference to the accompanying drawings, in which.

DETAILED DESCRIPTION

The following exemplary description is based on a system, apparatus, and method for use in the aviation industry. However, it will be appreciated that the invention may find application outside the aviation industry, particularly in other transportation industries, as well as in production lines or indeed in any industry which relies on or uses communications networks where a guaranteed network availability is critical.

Thus, embodiments of the invention find application in the travel industry, such as rail, coach, car, as well as in wired or wireless networks in general.

The following embodiments described may be implemented using Python. However, this is exemplary and other programming languages known to the skilled person may be used such as JAVA.

System Components

An embodiment of the invention will now be described referring to the functional component diagrams of FIG. 1 which shows the system as a whole including a plurality of integrated software applications or modules, also referring to the sequence flow diagram of FIGS. 2 and 3.

Figure 1:
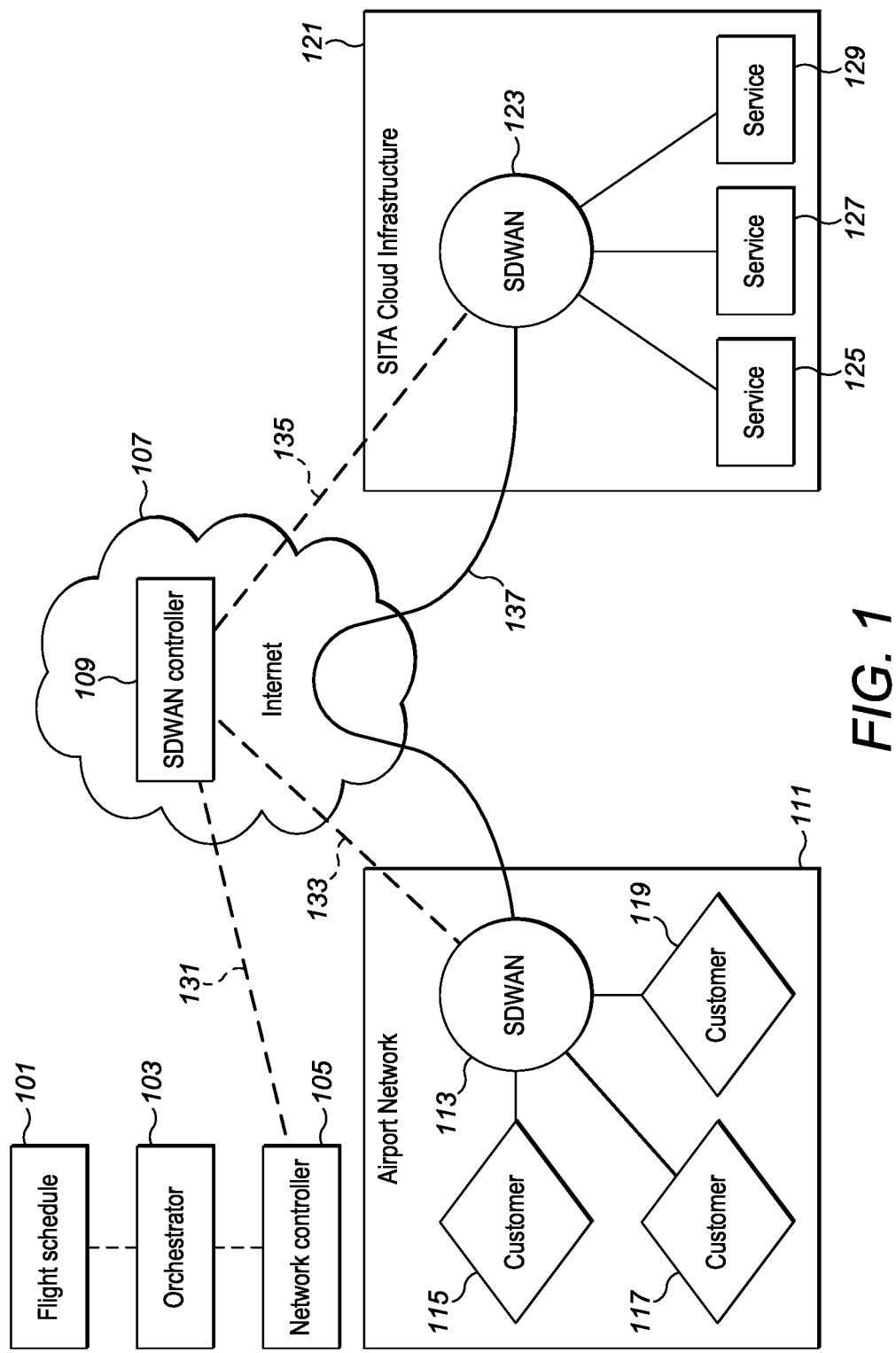
FIG. 1 is a schematic diagram of the main functional components embodying an aspect of the invention.

However, from the following description, it will be clear that it is not necessary for embodiments of the invention to include all of the modules shown in FIG. 1. Rather, embodiments of the invention may reside in a single functional component or module.

In the embodiment of FIG. 1, the system comprises: a flight schedule 101; an orchestrator 103; a network controller 105, also known as an SDN controller; an internet connection 107; an SDWAN controller 109; an airport network 111 comprising a first SDWAN edge device 113 and customer portals 115 to 119; and a proprietary back-end infrastructure 121 comprising a second SDWAN edge device 123 and service portals 125 to 129.

The system dynamically allocates the bandwidth of a network in a transportation network based on predetermined event. In preferred embodiments, the event is an aircraft landing or departing from an airport. This is achieved by configuring the orchestrator 103 to receive schedule data comprising journey data for a plurality of different journeys between an origin and destination. The schedule data for each journey also comprises data defining an estimated time associated with an event and data defining an equipment type. The orchestrator 103 establishes whether the bandwidth allocation should be changed based on a current bandwidth allocation and the bandwidth requirements of aircraft one or more recently landed aircraft.

The flight schedule API 101 provides flight information, such as arrival time, departure time and aircraft type. Such flight information is used during standard industry operations and may be accessed, for example, via a proprietary API, such as SITA's Flight Information API (https://www.developer.aero/Flight-Information-API/API-Overview). The arrival of aircraft into a specific airport is used as an input to modify the characteristics of the network via an Orchestrator module 103.

The Orchestrator 103 coordinates the retrieval of flight information, bandwidth allocation, and the initiation of an exchange of flight-related data between an aircraft and the local Airport LAN 111. Flight-related data may include any data related to the flight, the passengers, or their baggage. For example, flight-related data may include: flight plans; weather forecasts; passenger-related data; baggage-related data; aircraft diagnostic reports; and flight entertainment data. Although the description below relates to flight-related data being offloaded from an aircraft to the airport LAN, it will be appreciated that the description is equally applicable to flight-related data being sent from the airport LAN to the aircraft.

The orchestrator stores and maintains values such as the current amount of bandwidth in use by each customer, such as a particular airline, within the Airport Network 111. The Orchestrator 103 communicates with flight schedule 101 and network controller 105 via API calls and communicates with the Airport Network 111 via an SDWAN controller 109 to update the bandwidth allocated to a particular customer based on an event, such as the arrival of an aircraft. The Orchestrator module 103 obtains flight information from the flight schedule database 101. In some embodiments where the flight information is obtained via an API, this may be achieved using a GET request in the form of Aircraft Type/Airline/ScheduleAPI attributes.

It will be appreciated that the Orchestrator module 103 interacts with each airline's Departure Control System, usually via a module 102 (not shown) in order to determine flight information for a specific airport. This may be performed by way of Web Services Description Language, WSDL, Simple Object Access Protocol (SOAP), or Extensible Markup Language, XML, or using a REST\JSON API call, such as a RESTful API call. However, other messaging protocols for exchanging structured information over a network will be known to the skilled person. The functionality of the Orchestrator 103 is further described below.

A network controller 105, also known as an SDN controller, is responsible for the exchange of packets within the network. In the exemplary system shown in FIG. 1, a reactive forwarding application (not shown) is used to exchange packets between hosts and the switch interface connected to an SDWAN Edge device, to enable the transfer of flight-related data. The network controller 105 is communicatively connected to the Airport Network 111 and proprietary back-end infrastructure 121 via the SDWAN controller 109 with network connections 131, 133, 135.

The SDWAN Controller 109 is responsible for routing flight-related traffic from inside the airport LAN 111 to a proprietary back-end infrastructure 121. In the embodiment of FIG. 1, the SDWAN controller is hosted on a server connected to the internet network 107. This provides an interface which allows the configuration of individual SDWAN Edge devices, as well as the configuration of bandwidth allocations. This is achieved by the system making a request to the endpoint /configurationGetConfiguration to get the current bandwidth of a network link between the airport LAN and a customer, and uses the endpoint /configurationUpdateConfigurationModule to update the new bandwidth. Dynamically adjusting the network to provide a varying bandwidth to a particular customer guarantees a level of service, i.e. ensures a satisfactory level of network availability to each aircraft for the duration of time it is present at the airport.

A new SDWAN edge device may be provisioned by the SDWAN controller 119, for example by updating a configuration file to ensure an enterprise and configuration ID associated with the new SDWAN edge device matches those currently used by the system.

In exemplary embodiments, the Airport Network 111 comprises a Gateway Module 109 and one or more Customer Portals 115 to 119. Customers receive services provided by the proprietary back-end systems 121 via their respective customer portal. The SDWAN controller 109 regulates the provisioning of the services to each customer via SDWAN edge device 113, as further described below.

Each airport has its own airport network 111, and so in preferred embodiments the SDWAN controller 109 is connected to a plurality of airport networks.

A first SDWAN Edge device 113 provides a gateway into the Airport Network 111, and aims to route traffic in a more direct and controllable fashion. In the embodiment shown in FIG. 1, SDWAN Edge device 113 acts as a gateway between the Airport Network 111 and the SDWAN controller 109 via the internet 107. Examples of SDWAN edge devices include: routers; routing switches; integrated access devices (IADs); multiplexers; and a variety of metropolitan area network (MAN) and wide area network (WAN) access devices.

Customer networks 115 to 119 enable a customer to access the Airport Network 111 and the wider network connected via internet connection 107. In some embodiments, the customer networks 115 to 119 are networks run by the customers which are able to be connected to the wider airport network 111. The customer networks 115 to 119 are connected to the first SDWAN Edge device 113 and receive an allocation of the Airport Network's available bandwidth. The allocation of bandwidth is controlled by the SDN controller 105 via the first SDWAN Edge device 113 such that a guaranteed amount of bandwidth is allocated to a particular aircraft associated with a customer. The amount of bandwidth allocated is in accordance with the aircraft type, as further described below. Allocating bandwidth on an aircraft-by-aircraft basis advantageously enables the system to efficiently provide a finite resource, i.e. an airport's bandwidth, to a plurality of customers.

The proprietary back-end systems 121 include an SDWAN edge device 123, and one or more service portals 125 to 129. The back-end systems provide a customer with services via one or more service portals. The SDWAN controller 109 regulates the provisioning of the services to each customer via SDWAN edge devices 113 and 123, as further described below.

The back-end systems 121 may comprise one or more of: passenger processing systems; aircraft operation systems; cargo operation systems; airport operation systems (such as baggage handling and sortation); airline data operation systems; and communication infrastructure systems. In a specific embodiment, the proprietary back-end system is SITA's ATI Cloud (https://www.sita.aero/solutions-and-services/ati-cloud).

Similarly to the above, the second SDWAN Edge device 123 shown in FIG. 1 acts as a gateway between the proprietary back-end infrastructure 121 and the SDWAN controller 109.

System Operation

Usually, the messaging or communication between the different functional components in these figures is performed using the XML data format and programming language. However, this is merely exemplary, and other programming languages or data formats may be used, such as REST\JSON API calls. These may be communicated over HTTPS using wired or wireless communications protocols which will be known to the skilled person. Usually, each of the different functional components shown in FIG. 1 may communicate with each other, using wired or wireless communication protocols which will be known to the skilled person. The protocols may transmit service calls, and hence data or information between these components. Data within the calls is usually in the form of an alpha-numeric string which is communicated using wired or wireless communication protocols as previously described. In all cases, wired or wireless communications protocols may be used to exchange information between each of the functional components shown in FIGS. 1 and 2.

In the example shown in FIG. 1, the SDN controller 105 communicates with the SDWAN controller 109 with messages via a first communications link 131. The SDWAN controller 109 communicates with SDWAN Edge devices 113 and 123 with messages via second and third communications links 133 and 135. Finally, SDWAN Edge devices 113 and 123 can intercommunicate via a fourth communications link 137. Each of these communication links is performed via an internet connection 107.

Each of the modules may run on a separate computer processor or server, although it will be appreciated that embodiments of the invention may in principle run on a single computer or server. Usually, a wired or wireless communications network is used. This may communicatively couple one or more of the functional components shown in FIG. 1 together to allow data exchange between the component(s).

The claimed invention is beneficially able to provide a network that is dynamically controlled in response to events, such as the arrival or departure of aircraft. An example of how this may be achieved is described below with reference to the sequence of process steps indicated in FIGS. 2 and 3, which are further detailed below.

Figure 2:
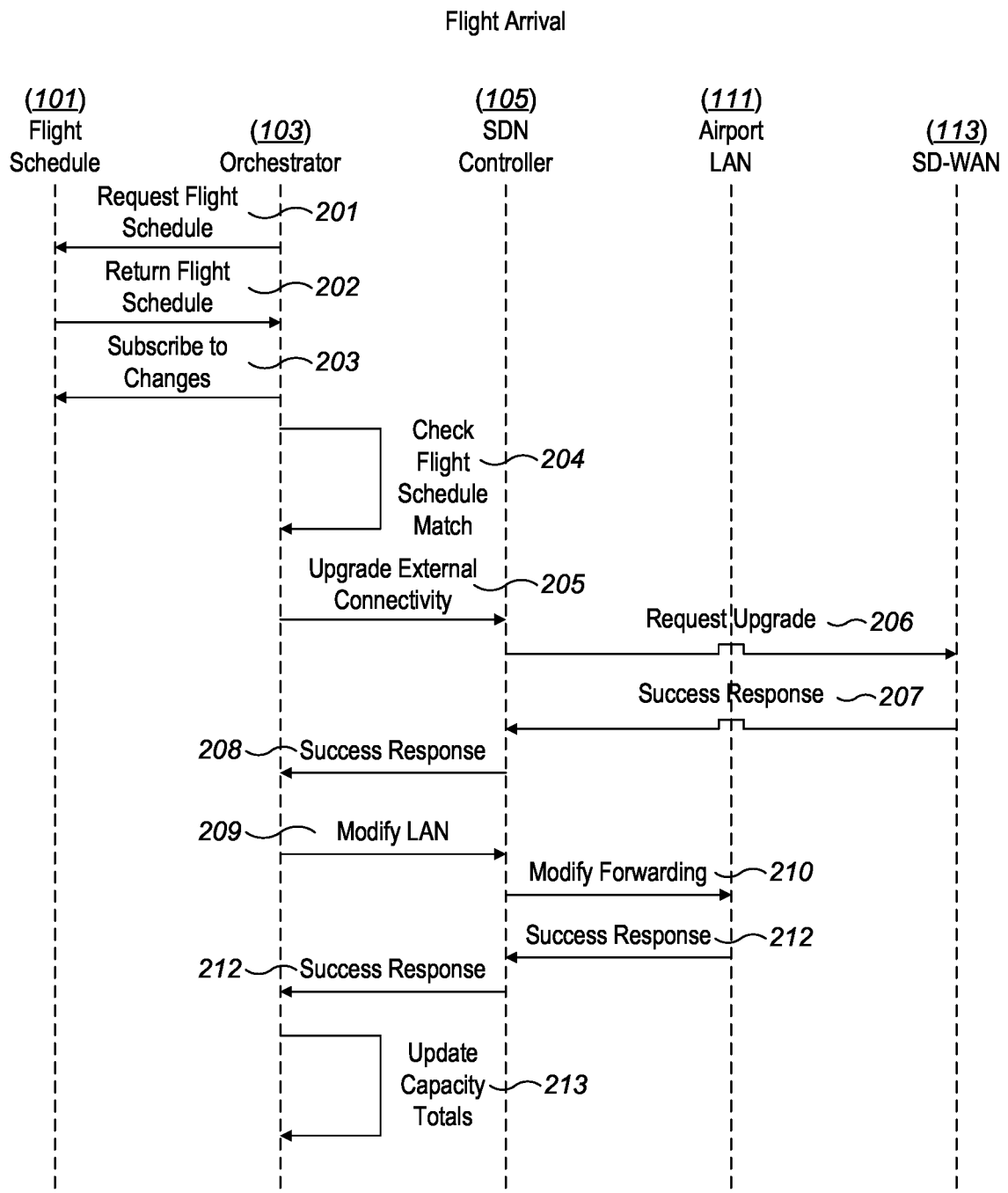
FIG. 2 is a sequence flow message diagram showing a number of steps which may be performed according to a specific embodiment of the invention configured for an arrival from a transportation hub.

FIG. 2 illustrates the process steps performed by the system for an aircraft scheduled to arrive at a particular airport.

In a first step 201, the Orchestrator 103 requests flight information from the Flight Schedule 101 via an API request.

To request all flight information from a specific airport, the following query may be used:

```
def getAllFlights(self, airport, airline, adi, carriers):
    url = self.path + "/flights"
    url = url + "/" + airport
    if airline:
        url = url + "/" + airline
        url = url + "/" + adi
    headers = {'x-apikey': self.key}
    r = requests.get(url, headers=headers)
    self.allFlightsCallback(r.json( ), adi, carriers, airport)
```

Thus, for the proprietary SITA Flight Information API, the GET query takes the form:
https://host/flifo/v3/flights/{airport}/{airline}/{adi}
Where:
"https://host/flifo/v3/flights" is the URL
"airport" is an airport code, e.g. AMS for Schiphol in Amsterdam;
"airline" is an optional airline code that ensures that only flights for the specified airline are retrieved; and
"adi" is an arrival or departure code, where "a" stands for "arrival" and "d" stands for "departure".

This call to the proprietary SITA Flight Information API gets a list of all flights arriving or departing within an arbitrary airport on a given day. This is used by the Orchestrator to gain an imperative understanding of when aircraft are due to land or depart. In preferred embodiments, step 201 is executed based on a trigger event. For example, the trigger event may be the system starting up, or a particular time of day. In further embodiments, step 201 is executed at multiple times during the day in order to obtain more accurate information.

The Orchestrator 103 also exposes API end-points for a visualisation system, such as a GUI. A first end-point, /airport/<airport>, relates to the airport to retrieve data from, for example Schiphol airport (AMS), as above. This end-point therefore allows the retrieval of information relating to a specific airport, for example: arrival information, bandwidth provisioned, data needed to be offloaded and aircraft that have landed.

In a second step 202, the Flight Schedule 101 returns a file documenting the arrival schedule of the airport, and a schedule of which aircraft have landed within the airport in an API response. The arrival schedule and the schedule of landed aircraft may include data related to one or more of: the carrier airline; flight number; flight status; scheduled arrival time; estimated arrival time; and aircraft type code. In preferred embodiments, the flight status is a descriptor which indicates the various states that a flight can take. For example, the flight status could be "on time", "late", "delayed", "cancelled", "re-routed", "arrived", or "departed".

Further to steps 201 and 202 above, the details of a specific flight may also be retrieved from the proprietary API service. An example source code for requesting specific flight data is provided below:

```
def getSpecificFlight(self, airport, airline, flightnumber, adi):
    url = self.path + "/flight/" + airport + "/" + airline + "/" + flightnumber + "/" + adi
    headers = {'x-apikey': self.key}
    r = requests.get(url, params=params, headers=headers)
    print(r.json( ))
```

A specific example of a response received from the flight schedule database 101, is shown below for a flight, DL40, departing from Los Angeles airport:

```
{
    "airportCode": "LAX",
    "airlineCode": "DL",
    "flightNumber": "40",
    "flightDate": "2018-11-20",
    "adi": "D",
    "subscribedForUpdates": true,
    "flightRecord": [
        {
            "operatingCarrier": {
                "airlineCode": "DL",
                "flightNumber": "40",
                "airline": "Delta Air Lines"
            },
            "airportCode": "JFK",
            "aircraft": "767",
            "status": "ON",
            "statusText": "On Time",
            "scheduled": "2018-11-20T09:15:00-0800",
            "estimated": "2018-11-20T09:15:00-0800",
            "city": "New York",
            "tailNumber": "N184DN",
            "gate": "22",
            "marketingCarriers": [
                {
                    "airlineCode": "VA",
                    "flightNumber": "6428",
                    "airline": "Virgin Australia"
                },
                {
                    "airlineCode": "G3",
                    "flightNumber": "8087",
                    "airline": "City Connexion Airlines"
                }
            ]
        }
    ],
    "success": true
}
```

The above exemplary JSON response indicates that flight DL40 is operated by Delta Air Lines and is scheduled to depart from Los Angeles International Airport on 20 Nov. 2018. The flight is currently on time and estimated to arrive at John F. Kennedy International Airport at the scheduled arrival time of 9.15 am local time, where it will proceed to arrivals gate 22. The response also lists the airlines which market the flight under their own airline designations and flight numbers through an airline code-sharing agreement under the "marketingCarriers" element. It will be appreciated that the above example response only shows schedule data relating to a single flight. Accordingly, it will also be appreciated that a huge quantity of data must be processed by the systems especially for large airports where many hundreds or thousands of flights arrive and depart each day.

Once the flight information has been retrieved from the Flight Schedule 101, it must be stored in memory for further use by the Orchestrator 103. In preferred embodiments, the retrieved JSON document is parsed and stored in an appropriate data structure for efficient access. An example source code extract showing this process is shown below.

```
def allFlightsCallback(self, json, adi, carriers, airport):
    for item in json['flightRecord']:
        car = item['operatingCarrier']
        if not carriers.exists(car['airline']):
            c = carriers.addCarrier(car['airline'],
car['airlineCode'])
            if 'estimated' in item:
                c.addAircraft(car['flightNumber'],
item['aircraft'], item['estimated'], adi)
            else:
                c.addAircraft(car['flightNumber'],
item['aircraft', item['scheduled'], adi)
        else:
            c = carriers.exists(car['airline'])
            if 'estimated' in item:
                c.addAircraft(car['flightNumber'],
item['aircraft'], item['estimated'], adi)
            else:
                c.addAircraft(car['flightNumber'],
item['aircraft'], item['scheduled'], adi)
```

The above example code extract takes the JSON document retrieved from the Flight Schedule API 101 as an input argument and loops through each flight record to store a parsed version of the flight data in the memory. The code extract then analyses the operating carrier ("car") of the flight and assesses whether the Orchestrator 103 has encountered the carrier before. If the operating carrier has not been encountered previously, a new Carrier instance is created which includes the corresponding flight information. If the operating carrier has been encountered previously, the corresponding operating carrier class is retrieved from the memory and the newly gathered information from the flight record is associated with the existing operating carrier entry.

It will be appreciated that the above description is exemplary only, and other methods of data storage (such as dictionaries or arrays) would be well known to the skilled person. In a third step 203, the Orchestrator 103 subscribes to receive changes in flight data from Flight Schedule 101. This is necessary as flight schedules are subject to change and so, to keep the stored flight schedule up to date, a further GET query may be used to subscribe the Orchestrator to receive updates to the flight schedule for a particular flight. An example request is shown below.

```
def requestUpdate(self, airport, airline, flightnumber, adi,
endpoint):
    url = self.path + "/notifications/" + airport + "/" + airline
+ "/" + flightnumber + "/" + adi
    params = {'notifyEndpoint': endpoint}
    headers = {'x-apikey': self.key}
    r = requests.get(url, params=params, headers=headers)
    print(r.json( ))
```

For example, for the above proprietary API, the following request may be sent:

```
https://host/flifo/v3/notifications/{airport}/{airline}/{flightNumber}
/{adi}
``` where:
"https://host/flifo/v3/notifications" is the URL;
{airport} is the airport IATA code associated with the flight;
{airline} is the airline IATA code of the requested flight;
{flightNumber} is the flight number of the requested flight;
{adi} indicates whether the requested flight is arriving at or departing from the airport associated with the flight.

A JSON message is returned to confirm successfully subscribing to receive flight schedule updates. An example confirmatory message is provided below:

```
{
    "airportCode": "LAX",
    "airlineCode": "DL",
    "flightNumber": "2355",
    "flightDate": "2018-11-20",
    "adi": "A",
    "subscribedForUpdates": true,
    "success": true
}
```

The above message indicates that the Orchestrator 103 has successfully subscribed for updates to the flight schedule of Delta Air Lines flight DL2355 scheduled to arrive at Los Angeles International Airport on 20 Nov. 2018.

Changes in the flight schedule are stored in the system memory. For example, if a delay results in a late departure then the flight schedule will be updated with a new estimated arrival time of the aircraft. The original arrival time, i.e. the scheduled arrival time, remains unchanged.

Once the Orchestrator 103 has a record of all scheduled arrivals and all flights that have already landed, the Orchestrator 103 determines a bandwidth requirement for one or more flights that are scheduled to arrive based on the amount of data to be offloaded by a particular aircraft.

For example, the arrivals schedule may indicate that a KLM aircraft, flight KL1218, is due to arrive at 5.50 pm local time. The arrivals schedule also indicates the aircraft type code ("E75"), which in this example indicates that the aircraft type is an Embraer ERJ-175. From this information, the Orchestrator 103 is able to execute an algorithm to determine how much bandwidth the particular aircraft type requires in order to offload its flight-related data on arrival. This may be achieved by searching a look-up table which details bandwidth requirements for each aircraft type. For example, whereas the Embraer aircraft in the above example may only need to offload 15 Mb of data, larger aircraft, such as a Boeing 787, may need to offload 100 Mb of data or more.

In specific embodiments, the Orchestrator 103 uses the following example source code extract to determine the amount of data to be offloaded by a particular aircraft.

```
def getPlaneData(self, craft):
    if craft in self.planes:
        return self.planes[craft]
    else:
        return random.randint(5, 25)
```

Running the above code creates a table of aircraft and their corresponding data requirements. The table is later referenced to identify the amount of data to be offloaded and, if the aircraft is not listed, the aircraft is allocated a data allowance between 5 Gb and 25 Gb.

In some embodiments, particular customers may have bandwidth restrictions. Since bandwidth is a finite resource, the relative amounts of bandwidth allocated to each customer may be restricted. For example, the airline KLM may be allocated 5% of the total available bandwidth at the airport. Thus, the system may determine whether a subsequent KLM flight that has recently arrived would cause the customer to exceed their total bandwidth allocation. This may be achieved by comparing the customer's bandwidth requirements for all landed flights against the customer's bandwidth allocation. The customer's total bandwidth allocation cannot be exceeded. If a customer reaches their total bandwidth allocation, no further bandwidth is provisioned and the exchange of data takes longer to occur.

In a fourth step 204, the Orchestrator 103 periodically compares the current time to the estimated arrival time of a particular flight. If the current time exceeds the estimated arrival time then the Orchestrator 103 deems the aircraft to have landed at the airport. In preferred embodiments, the Orchestrator 103 recursively calculates whether a particular flight has landed at an interval of 5 seconds. In alternative embodiments, the Orchestrator 103 is able to subscribe to changes in the flight status and would be notified of a particular flight arriving when the flight status changes to "arrived" or "landed".

A specific example of a recursive algorithm for determining flight arrival is provided below:

```
def loop(self):
    currDateTime = self.getCurrentTimeInFormat( )
    for key, item in self.carriers.getCarriers( ).iteritems( ):
        for flightNo, aircraft in item.getAircrafts( ).iteritems( ):
            date, time = aircraft.getSchedule( ).split("T")
            airplaneDateTime = datetime(int(date), int(time))
            if airplaneDateTime < currDateTime:
                if aircraft.getStatus( ) = = "a":
                    self.arrivedAircraft[flightNo] = aircraft
                    self.updateFlight(flightNo)
                    self.orch.arrival(aircraft, self.name)
                else:
                    self.departedAircraft[flightNo] = aircraft
                    aircraft.setState("Departed")
    loop = threading.Timer(5, self.loop)
    loop.start( )
```

In the above exemplary code extract, the algorithm initially calculates the current time considering the time zone of the destination airport, i.e. the airport where the particular aircraft will land. In other embodiments, the current time may be a standardised universal time, such as Coordinated Universal Time (UTC), to enable times from different time zones to be compared.

The algorithm performs this calculation for each flight stored in the memory. For each flight entry in the memory, the time of arrival for the flight is retrieved from the Flight Schedule 101 and compared against the calculated current time at the corresponding destination airport. If the current time is greater than the time of arrival, i.e. the current time is later than the time the flight is scheduled to arrive, then the flight is determined to have landed at the airport. The algorithm recursively calls itself in order to determine whether flights have landed at regular intervals. For example, the algorithm may call itself at an interval of once every 5 seconds.

In other embodiments, the algorithm recursively calls itself based on event-driven operations rather than a predetermined time interval. For example, a request 203 can be made to the Flight Schedule API 101 for updates to the flight related information for a particular flight. Once a particular flight has arrived, and its flight status has been updated, the API makes a request to a specified endpoint which can then be administered by the Orchestrator 103.

In a fifth step 205, the Orchestrator 103 requests an upgrade to external connectivity and in a sixth step 206 the request is relayed to the first SDWAN Edge device 113 by the SDN controller 105.

When an aircraft arrives, the system ensures that flight-related data can be transferred efficiently by upgrading the quality of service requirements of the network. In some embodiments, this is achieved in the following way to coordinate multiple interconnected components.

Firstly, the Orchestrator 103 communicates with the SDN controller 105 via an exposed interface. In turn, the SDN controller 105 communicates with the SDWAN controller 109. The SDN controller 105 at this stage is unaware of the current bandwidth requirements of each customer within the Airport LAN 111 and merely coordinates the quality of service upgrade or downgrade based upon communications with the Orchestrator 103.

The quality of service (QoS) is a measurement of the performance of a computer network. Thus, improving the QoS of the network improves the performance of the network and a user's end experience of the network. In some embodiments, the QoS may be used to provide prioritisation of different users in order to guarantee a base level of performance for individual users. In preferred embodiments of the invention, a QoS of 10 Mbps bandwidth, 5 ms latency, and a 5 ms jitter may be provided for an A380 aircraft type having a data offload of 100 MB.

In specific embodiments, an abstraction module (not shown) was utilised to abstract communications between the SDN controller 105 and the SDWAN controller 109. An extract of an example API code is provided below which shows how the SDN controller 105 coordinates the modification of the quality of service requirements via the SDWAN controller 109.

```
def updateQoS(self, latency, bw):
    configuration =
self.api.configurationGetConfiguration({"enterpriseId":
self.enterprise,
"configurationId": self.config,
"with": ["modules"]})
    qos_module = None
    for module in configuration.modules:
        if module.name = = "QOS":
            qos_module = module
            break
    for rule in qos_module.data['segments'][0]['rules']:
        if rule['name'] = = self.QoS:
            rule['action']['QoS']['rxScheduler']['latency'] = 0
rule['action']['QoS']['rxScheduler']['bandwidthCapPct'] = bw
            rule['action']['QoS']['txScheduler']['latency'] = 0
rule['action']['QoS']['txScheduler']['bandwidthCapPct'] = bw
    result =
self.api.configurationUpdateConfigurationModule({"id": qos_module.id,
"_update":qos_module})
    return result
```

In the above embodiment, the current quality of service configuration is requested from the SDWAN controller 109. The current configuration is then modified to reflect the quality of service requirements of each customer in the Airport LAN 111. This modified configuration is then sent back to the SDWAN controller 109 via a configurationUpdateConfigurationModule( ) API call.

In a seventh step 207 an upgrade confirmation response is sent from the SDWAN Edge device 113 to SDN Controller 105. The upgrade confirmation is relayed from the SDN controller to the Orchestrator 103 in an eighth step 208.

Upon receiving a notification 207 that upgrading the connectivity of a particular customer was successful, the SDN controller 105 notifies the Orchestrator 103 that the transaction is complete via notification 208. In specific embodiments this is achieved by communicating with the Orchestrator 103 via an exposed RESTful API, for example via the example API request below:

```
def notifyOrchestrator(self, aircraft, bw):
    url = "http://localhost:5050/notify/"
    url = url + str(aircraft) + "/" + str(bw)
    r = requests.get(url)
```

In a ninth step 209 a request to modify the LAN is sent from the Orchestrator 103 to SDN controller 105. In a tenth step 210, the request is forwarded from the SDN controller 105 to the Airport LAN 111.

To update the network architecture and begin transfer of aircraft flight-related data, the Orchestrator 103 sends a request 209 to the network controller 105 requesting to modify the LAN. In preferred embodiments, this is achieved via a RESTful API call. In turn the network controller 105 communicates with the Airport LAN 111 via request 210. An example code extract of API request 209 is provided below:

```
def updateController(self, data, bw, key, bwKey):
    url = "http://localhost:8181/onos/luxsita/bandwidth/"
    url = url + str(data)
    r = requests.get(url)
``` where "data" is the amount of data to be transferred to customer network.

As indicated above, the network requirements of the Airport LAN 111 are adjusted in response to a particular aircraft landing at the corresponding airport. This is to ensure that the Airport LAN 111 architecture is modified to effectively handle the flight-related data needed to be offloaded by the recently arrived aircraft.

In specific embodiments, this is achieved by creating additional host nodes within the network. The additional host nodes model the newly arrived aircraft and their data transmission via network links to switches within the Airport LAN 111. This is achieved using software-defined paradigms, for example using the code extract provided below:

```
def do_cmd(self, bw):
    self.lock.acquire()
    newHost = 'h' + str(self.counter)
    switch = self.net.get('s1')
    self.net.addHost(newHost)
    self.net.addLink(switch, self.net.get(newHost))
    newLink = 's1-eth' + str(self.counter)
    switch.attach(newLink)
    ifCmd = 'ifconfig h' + str(self.counter) + '-eth0 10.' + str(self.counter)
    self.net.get(newHost).cmd(ifCmd)
    self.net.get(newHost).cmd('route add -net 0.0.0.0 gw 10.0.0.3')
    self.counter += 1
    self.lock.release()
    logging.info("Starting transfer, " + newHost)
    self.net.get(newHost).cmd('python ftp.py ' + bw)
```

-continued
```
    logging.info("Transfer complete, " + newHost)
    return 1
```

In the above code extract, a new network host ("newHost") is created and linked to the SDWAN controller 109 via a SDWAN edge device 113. The new host is then provided with network access via a new virtual network link ("newLink"), for example via executed Linux commands. Upon successfully providing the new host with network access, the host then begins transmitting flight-related data across the newly established network link to the SDWAN controller. In specific embodiments, this may be achieved using a proprietary Python module.

An advantage of this approach is an improved efficiency of the system, due to the dynamic network architecture creating nodes within the network as they are required and removing them when they are no longer required. Accordingly, reservations for bandwidth allocations are made on a non-permanent, or releasable, basis. This means that network resources are saved by enabling multiple customers to effectively share a network connection without exceeding the airport's bandwidth capacity.

In an eleventh step 211 a modification confirmation response is sent from the Airport LAN 111 to SDN Controller 105. The modification confirmation is relayed from the SDN controller 105 to the Orchestrator 103 in a twelfth step 212. In preferred embodiments, the confirmatory notifications are standardised HTTP confirmatory messages.

Once the Airport LAN 111 has been successfully updated, the Airport LAN 111 sends a request 211 to the SDN controller 105 indicating that network modification is successful.

In the specific embodiments recited by steps 209 and 210 above, the updateController( ) code prevents the SDN controller 105 from reporting the successful modification of the network via request 212 from being issued until notification 211 has been received. Therefore, upon receiving notification 211 from the Airport LAN 111, the SDN controller 105 is free to send the API call 212 notifying the Orchestrator 103 that the network modification has been successful.

Further to the above, upon receiving a successful response from the SDN controller 105 via API call 212, a call back is made which continues the further execution of the Orchestrator 103. An example call back is provided below.

```
def updateController(self, data, bw, key, bwKey):
    url = "http://localhost:8181/onos/luxsita/bandwidth/data/"
    url = url + str(data)
    r = requests.get(url)
    if r.status_code != 200:
        print "ONOS REST API Not active, will not send traffic through Edge"
    self.callback(data, bw, key, bwKey)
    print r.json()
```

In a final step 213, the Orchestrator 103 assesses and updates the bandwidth capacity currently required by aircraft within the Airport LAN 111. This is achieved by maintaining a record of which aircraft have landed and how much data is needed to be offloaded. A specific example of an API call that achieves this is provided below:

```
def arrival(self, aircraft, airport):
    dataToUpdate = self.aircraftBW.getPlaneData(aircraft.getCraft())
```

-continued

```
    customer = aircraft.code #Get airline code of aircraft
    bwToApply = calculateBW(dataToUpdate)
    self.lock.acquire( )
    if self.curBW + bwToApply > 100:
        print "Cannot provision bandwidth for this plane, trying
again"
        self.lock.release( )
        return
    aircraft.setState("Arrived")
    if customer in self.bwDict:
        self.bwDict[customer]["bw"] = self.bwDict[customer]["bw"] +
bwToApply
    else:
self.bwDict[customer] = {"bw": bwToApply}
    key = self.aircraftBW.updateData(dataToUpdate, aircraft.code,
None)
    self.updateVeloBW(self.curBW + bwToApply)
    thread = Thread(target=self.updateController,
args=(dataToUpdate, bwToApply, key, customer))
    thread.start( )
    self.lock.release( )
```

In the above example code extract, the request is executed upon the arrival of a particular aircraft at a destination airport. The amount of data required to be offloaded is first retrieved, and subsequently used to calculate the amount of bandwidth granted for the transmission. In this specific embodiment, if an airport is not able to handle the additional bandwidth upgrade, no provisioning is done until an aircraft that has arrived earlier has finished transmitting data and has had its resource requirement cleared. Therefore, aircraft that arriving at the destination airport earlier gain priority in acquiring bandwidth provision.

In alternative embodiments, the method above may also include dynamic modification and reallocation of bandwidth provision upon determining that the maximum amount will be reached imminently.

Figure 3:
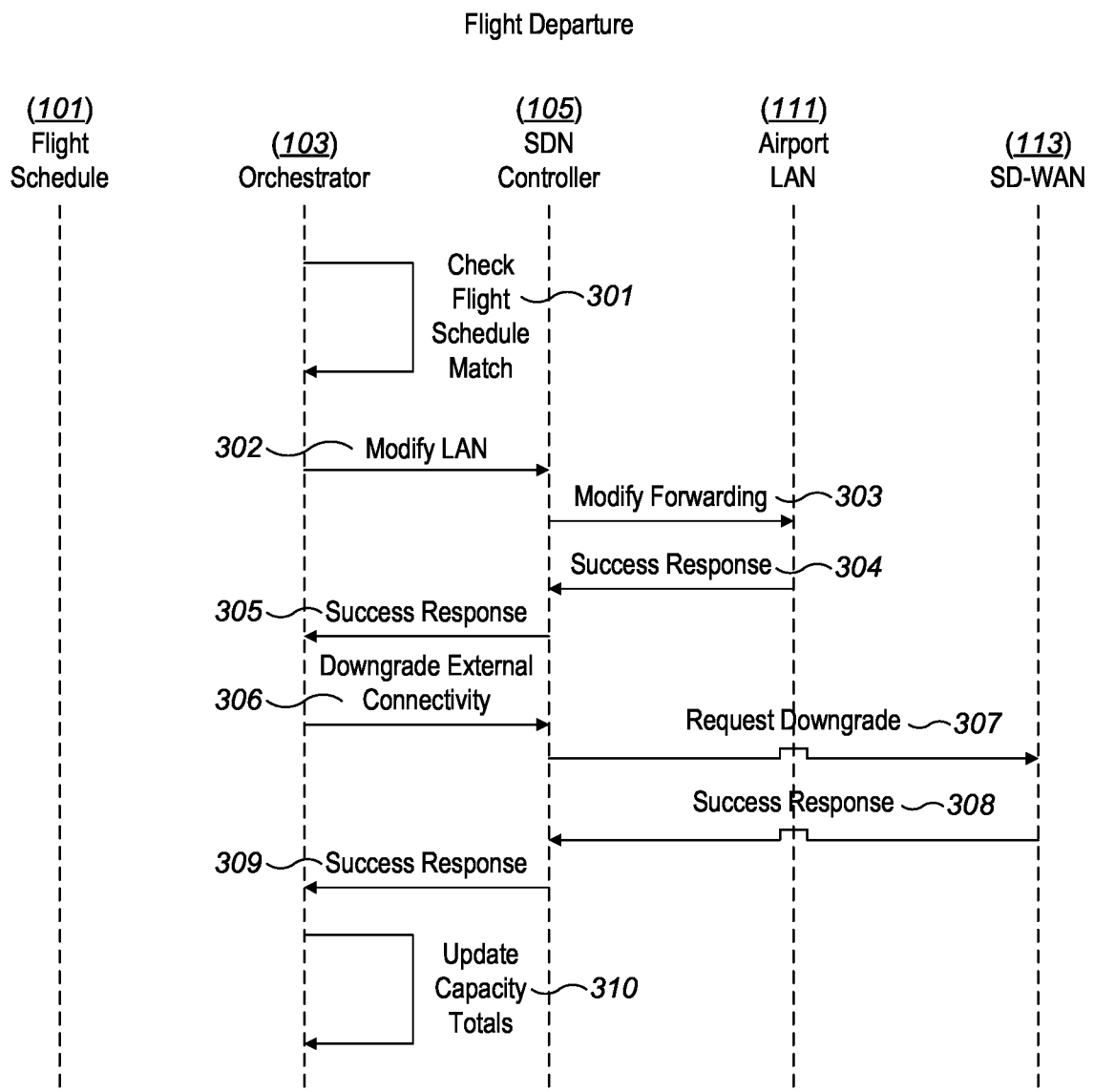
FIG. 3 is a sequence flow message diagram showing a number of steps which may be performed according to a specific embodiment of the invention configured for a departure at a transportation hub.

FIG. 3 illustrates the process steps performed by the system for an aircraft scheduled to depart from a particular airport.

Once a particular aircraft has successfully transferred flight-related data, the network is restored to its previous conditions. In some embodiments, the network is restored to its original conditions once the system has been notified that the aircraft that has offloaded data has departed from the airport.

The same methods of communication between components for notifying the system that an aircraft has departed from the airport as those used for notifying the system that an aircraft has arrived, as previously described above. Thus, the steps of FIG. 3 for aircraft departure are described with reference to the equivalent steps of FIG. 2. However, key parameters are changed such as: aircraft type, airport, flight status, estimated time of arrival and scheduled time of arrival. For example, the parameter relating to an arrival time may be replaced by a parameter relating to a departure time.

In a first step 301, the Orchestrator 103 performs the same steps as described above for step 204 except that the current time is compared to a scheduled departure time rather than a scheduled arrival time.

In second and third steps 302 and 303, steps equivalent to steps 209 and 210 described above are performed by the Orchestrator 103 and the SDN controller 105, except that instead of modifying the LAN to increase the amount of data, the Airport Network 111 is modified such that the amount of data is reduced. In specific embodiments, this may be achieved by removing network host nodes and network links within the network 111, as opposed to adding network host nodes and network links as described above.

In fourth and fifth steps 304 and 305, the Airport LAN 111 and SDN controller 105 perform the same processes as steps 211 and 212 described above.

In sixth and seventh steps 306 and 307, the system performs steps equivalent to steps 205 and 206 described above, except that instead of requesting that the SDWAN Edge device 113 increases the amount of data provided to the Airport Network 111, the SDN controller 105 requests that the SDWAN Edge device 113 decreases the amount of data.

In eighth and ninth steps 308 and 309, the SDWAN device 113 and SDN controller 105 perform the same processes as steps 207 and 208 described above.

In a tenth step 310, the Orchestrator 103 assesses and updates the bandwidth capacity currently required by aircraft within the Airport LAN 111.

In accordance with the above, once the aircraft has departed from the airport, the Orchestrator 103 is notified by the SDN controller 105 and resources are instantly released, terminating network links inside the Airport LAN 111 as well as removing data and bandwidth requirements from the Orchestrator memory. This approach has the advantage of freeing resources for other aircraft and allowing more resources to be shared between aircraft within the Airport LAN 111. An example implementation is provided below which outlines this behaviour:

```
    def callback(self, data, bw, key, bwKey):
        self.lock.acquire( )
        self.aircraftBW.updateData(None, None, key)
        self.removeFromDict(bw, bwKey)
        self.updateVeloBW(self.curBW - bw)
        self.lock.release( )
```

This code extract document the process the Orchestrator takes upon successful departure. Initially, the updateData( ) method, which is used previously in step 213 to allocate data requirements, is called to remove the previously acquired requirement. This method takes a 'key' as an input argument which is used to remove the requirement from the dictionary holding the data in memory. Additionally the removeFromDict( ) method is called which removes the bandwidth requirements from the Orchestrator memory. The updateVeloBW( ) method, which is previously used in step 213 to provision bandwidth at the SDWAN controller, is then called to remove allocation of bandwidth. This method ultimately makes a request to the SDWAN controller and uses the overall current bandwidth requirement stored in memory and the bandwidth required by the specific aircraft to deduce the new bandwidth allocation required.

When an aircraft departs from the airport and is no longer connected to the Airport LAN 111, the host within the network is removed and the virtual network links providing connectivity between the Airport LAN 111 and the customer network are also removed. Accordingly, it will be understood that the system removes the reservations which guarantee a bandwidth allocation to a particular aircraft once that aircraft has departed the airport, thus enabling a subsequent aircraft to make use of the connection thereby enabling the system to allocate bandwidth in an efficient manner.

An example code extract documenting this process is provided below:

```
def downgradeLAN(self, host):
    switch = self.net.get('s1')
    self.net.removeHost(host)
    self.net.removeLink(switch, self.net.get(host))
    return True
```

This extract is executed within the airport LAN and removes traces of the host within the network. Upon successful execution the airport LAN then notifies the SDN controller of the procedure. The SDN controller then notifies the Orchestrator that the process has been successfully executed.

The description above makes reference to comparatively few aircraft for simplicity. However, it will be appreciated that the above systems and processes would also work for a plurality of aircraft, where bandwidth allocation is provided by considering the bandwidth requirements of a net volume of aircraft that are in a particular airport. In other words, the system considers the total amount of aircraft that have landed, or are about to land, within a certain time period against a total amount of aircraft that are scheduled to depart within the same time period.

Additionally, although the above description is in the context of allocating bandwidth based on an aircraft landing or departing from an airport it will be appreciated that other events may be used instead. For example, the event may be detecting an extreme weather event, such as a tornado, at an airport via a weather forecasting API. This event would trigger the reconfiguration of the network for all airlines scheduled to at the affected airport such that bandwidth would be made available at another, safe, airport instead. Accordingly, the aircraft will be able to connect to their network environment on landing at the new airport.

From the foregoing, it will be appreciated that the system, device and method may include a computing device, such as a desktop computer, a laptop computer, a tablet computer, a personal digital assistant, a mobile telephone, a smartphone.

The device may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C#, C++, Java, scripting languages, assembly languages, machine code instructions, instruction-set-architecture (ISA) instructions, and state-setting data.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as a circuit board which may include a CPU, a bus, RAM, flash memory, one or more ports for operation of connected I/O apparatus such as printers, display, keypads, sensors and cameras, ROM, a communications sub-system such as a modem, and communications media.

The invention claimed is:

1. A computer processing system (100) for dynamic bandwidth allocation of a network in a transportation network, the system comprising a processor configured to:
   i. receive schedule data, wherein the schedule data comprises data defining a plurality of different journeys between an origin and a destination, and data defining an aircraft type;
   ii. identify a predetermined event type for each journey based on the schedule data;
   iii. generate a request to change the bandwidth allocation of the network based on the predetermined event type and the aircraft type.

2. The computer processing system of claim 1, wherein the module is further configured to generate the request in response to identifying the predetermined event type for a particular journey.

3. The computer processing system of claim 1, wherein the system further comprises a second module (105) communicatively coupled to the first module (103) and configured to receive the request to change the bandwidth allocation of the network.

4. The computer processing system of claim 3, wherein the system further comprises a local access network including one or more control devices (113) communicatively connected to the second module (105).

5. The computer processing system of claim 4, wherein the one or more control devices (113) are configured to provide a network connection to a customer via a customer network (115).

6. The computer processing system of claim 1, wherein the module (103) is further configured to identify an amount of data associated with the aircraft type for a selected journey.

7. The computer processing system of claim 6, wherein the module (103) is further configured to identify a current bandwidth allocation for a customer.

8. The computer processing system of claim 7, wherein the module (103) is configured to generate the request based on the amount of data associated with the aircraft type for a selected journey and the current bandwidth allocation for the customer.

9. The computer processing system of claim 1, wherein the module (103) is further configured to receive updates to the schedule data.

10. The computer processing system of claim 1, wherein the module (103) further comprises a memory for storing a parsed version of the schedule data.

11. The computer processing system of claim 1, wherein the schedule data further comprises data defining an estimated time associated with each of the plurality of journeys.

12. The computer processing system of claim 11, wherein the module (103) is further configured to identify the predetermined event type by comparing a current time with the estimated time associated with one of the journeys.

13. The computer processing system according to claim 12, wherein the module (103) is further configured to generate the request if the current time is greater than the estimated time associated with one of the journeys.

14. The computer processing system according to claim 12, wherein the module (103) is further configured to compare the current time to the estimated time in response to a predefined event.

15. The computer processing system according to claim 14, wherein the predefined event is a predetermined time interval.

16. The computer processing system of claim 1, wherein the journeys are flights.

17. The computer processing system of claim 1, wherein the schedule data is flight schedule data.

18. The computer processing system of claim 17, wherein the flight schedule data comprises one or more of passenger related information, flight number, flight date, flight status, scheduled arrival time, estimated arrival time scheduled departure time, or estimated departure time.

19. A method for dynamically allocating bandwidth of a network in a transportation network, the method comprising:
   a. receiving schedule data at a module (103), wherein the schedule data comprises data defining a plurality of different journeys between an origin and a destination, and data defining an aircraft type;
   b. identifying, with the module (103), a predetermined event type for each journey based on the schedule data;
   c. generating, at the module (103), a request to change the bandwidth allocation of the network based on the predetermined event type and the aircraft type.

\* \* \* \* \*